United States Patent [19]
Morimoto et al.

[11] Patent Number: 5,380,685
[45] Date of Patent: Jan. 10, 1995

[54] BRONZE-COLORED INFRARED AND ULTRAVIOLET RADIATION ABSORBING GLASS

[75] Inventors: Shigeki Morimoto, Mie; Tadashi Noguchi, Matsusaka, both of Japan

[73] Assignee: Central Glass Company, Ltd., Ube, Japan

[21] Appl. No.: 31,984

[22] Filed: Mar. 16, 1993

[30] Foreign Application Priority Data

Mar. 18, 1992 [JP] Japan ................... 4-062418
Jul. 14, 1992 [JP] Japan ................... 4-187016

[51] Int. Cl.$^6$ ................................. C03C 3/087
[52] U.S. Cl. ................................. 501/71; 501/70
[58] Field of Search ........................ 501/71, 70

[56] References Cited

U.S. PATENT DOCUMENTS

| | | | |
|---|---|---|---|
| 2,444,976 | 7/1948 | Brown | 501/70 X |
| 4,101,705 | 7/1978 | Fischer et al. | 501/71 X |
| 4,104,076 | 8/1978 | Pons | 501/71 X |
| 4,190,452 | 2/1980 | Fischer et al. | |
| 4,792,536 | 12/1988 | Pecoraro et al. | 501/70 |
| 5,023,210 | 6/1991 | Krumweide et al. | 501/71 |
| 5,030,593 | 7/1991 | Heitoff | 501/70 X |
| 5,030,594 | 7/1991 | Heitoff | 501/70 X |
| 5,077,133 | 12/1991 | Cheng | 501/70 X |
| 5,112,778 | 5/1992 | Cheng et al. | 501/31 |
| 5,264,400 | 11/1993 | Nakaguchi et al. | 501/71 |
| 5,318,931 | 6/1994 | Nakaguchi et al. | 501/64 |

FOREIGN PATENT DOCUMENTS

| | | |
|---|---|---|
| 2672587 | 8/1992 | France . |
| 52-102310 | 8/1977 | Japan . |
| 58-13504 | 3/1983 | Japan . |
| 63-44695 | 9/1988 | Japan . |
| 2252973 | 8/1992 | United Kingdom . |

Primary Examiner—Mark L. Bell
Assistant Examiner—David R. Sample
Attorney, Agent, or Firm—Keck, Mahin & Cate

[57] ABSTRACT

An infrared and ultraviolet radiation absorbing glass suitable for use in building and vehicle windows, which comprises, on a weight basis, 68–74% of $SiO_2$, 0.1–3.0% of $Al_2O_3$, 8–11% of CaO, 2.0–4.5% of MgO, 11.5–16.0% of $Na_2O$, 0.5–3.0% of $K_2O$, 0.1–0.4% of $SO_3$, 0.10–0.55% of total iron expressed as $Fe_2O_3$, 0.2–0.6% of $CeO_2$, 0.3–14 ppm of CoO and 5–20 ppm of Se. In the glass the ratio of ferrous iron to ferric iron is in the range from 0.17 to 0.55. The glass has a bronzy tint and is well balanced in visible light transmittance, infrared radiation absorption and ultraviolet radiation absorption, and a sheet of the glass can be easily tempered by a conventional method.

12 Claims, 2 Drawing Sheets

BRONZE-COLORED INFRARED AND ULTRAVIOLET RADIATION ABSORBING GLASS

BACKGROUND OF THE INVENTION

This invention relates to an infrared and ultraviolet radiation absorbing glass. The glass has a bronze color and sufficiently high transmittance for visible light and is particularly suitable for use in building and vehicle windows.

For windows of buildings, automobiles and other vehicles there is an increasing demand for sheet glass that is sufficiently transparent to visible light and absorptive of not only infrared rays but also ultraviolet rays.

It is known to render a soda-lime-silica glass absorptive of infrared and ultraviolet rays by incorporating iron in the glass. Ferrous iron expressed as FeO provides the glass with the absorption of infrared radiation, whereas ferric iron expressed as $Fe_2O_3$ provides the glass with the absorption of ultraviolet radiation. In practice $Fe_2O_3$ is used as the source of the entire iron, and an adequate portion of $Fe_2O_3$ is reduced to FeO during the glassmaking process.

Also it is known to incorporate $CeO_2$ and/or $TiO_2$ in a soda-lime-silica glass for the absorption of ultraviolet radiation.

From an industrial point of view, it is desired that an infrared and ultraviolet absorbing glass in the form of sheet glass can be produced without significantly changing the conditions of conventional glass melting and refining operations. Also it is desired that an infrared and ultraviolet absorbing glass sheet can easily be toughened by a conventional tempering method. Besides, an infrared and ultraviolet absorbing glass sheet is desired to have a pleasing tint such as bronzy tint.

JP-A-52-102310 shows a neutral grayish- or bronze-colored infrared absorbing soda-lime-silica glass containing as essential components, on a weight basis, 65-75% of $SiO_2$, 0-5% of $Al_2O_3$, 5-15% of CaO, 0-10% of MgO, 10-18% of $Na_2O$, 0-5% of $K_2O$, 0.0005-0.02% of $Cr_2O_3$, 0.0010-0.01% of CoO, 0.0001-0.03% of Se and 0.1-0.19% of $Fe_2O_3$ with provisos that the total of CaO and MgO is from 0 to 16% and that the total of $Na_2O$ and $K_2O$ is from 10 to 20%. However, this glass is insufficient in absorption of infrared and ultraviolet radiation, and thus is not useful for vehicle windows.

JP-B-58-13504 shows a bronze-colored ultraviolet absorbing soda-lime-silica glass containing, on a weight basis, 0.2-0.5% of total iron expressed as $Fe_2O_3$, 5-25 ppm of Se and 0-20 ppm of CoO. The optical characteristics of this glass at a thickness of 3 mm with using standard illuminant C are as follows.

Visible light transmittance Y is not less than 70%. Light transmittance in the wavelengths of ultraviolet rays is smaller than that in the wavelengths of visible light rays. The excitation purity Pe is from 2 to 6%. The dominant wavelength $\lambda_D$ is from 570 to 580 nm. However, this glass is still insufficient in ultraviolet radiation absorption.

JP-B-63-44695 shows a bronze-colored ultraviolet absorbing soda-lime-silica glass containing as essential components, on a weight basis, 65-75% of $SiO_2$, 0.3-5% of $Al_2O_3$, 5-15% of CaO, 1-10% of MgO, 10-18% of $Na_2O$, 0-5% of $K_2O$, 0.22-2% of $Fe_2O_3$, 0-0.01% of CoO, 0.1-0.003% of NiO and 0.0005-0.015% of Se with provisos that the total of CaO and MgO is from 6 to 16%, that the total of $Na_2O$ and $K_2O$ is from 10 to 20% and that the weight ratio of $Fe_2O_3$ to CoO is not less than 100. This glass exhibits a dominant wavelength of 580 to 590 nm by the 2° visual field measurement with using standard illuminant A. However, this glass may change in color and may become weak in strength in heat treatment due to the addition of NiO.

U.S. Pat. No. 2,444,976 shows a ultraviolet absorbing glass having a golden tint, which contains, on a weight basis, 65.6% of $SiO_2$, 0.4% of the total of $Al_2O_3$ and $Fe_2O_3$, 11.8% of CaO, 12.2% of $Na_2O$, 0.5% of $As_2O_3$, 7.5% of $TiO_2$ and 2.0% of $CeO_2$. However, this glass is insufficient in infrared absorption.

SUMMARY OF THE INVENTION

It is an object of the present invention to provide an infrared and ultraviolet absorbing glass, which has bronzy tint, which is well balanced in visible light transmittance, infrared radiation absorption and ultraviolet radiation absorption, and which can be readily toughened by a conventional tempering method.

The present invention provides a bronze-colored infrared and ultraviolet radiation absorbing glass comprising as coloring components, on a weight basis, 0.10-0.55% of total iron expressed as $Fe_2O_3$, 0.2-0.6% of $CeO_2$, 0.3-14 ppm of CoO and 5-20 ppm of Se.

In this invention, it is an important feature that a large amount of NiO is not used for making a glass according to the present invention. According to the invention, the glass is rendered adequately absorptive of infrared and ultraviolet rays without unduly sacrificing visible light transmittance by carefully and strictly specifying the proportions of the fundamental components of soda-lime-silica glass, by additionally incorporating relatively small and strictly specified amounts of coloring components, i.e. $CeO_2$, total iron expressed as $Fe_2O_3$, CoO and Se, and by specifying the degree of reduction of iron. In the invention, $TiO_2$ is optionally used as a coloring component.

A preferred embodiment of the present invention includes a glass containing, on a weight basis, 0.35-0.43% of said total iron expressed as $Fe_2O_3$, 0.3-0.6% of said $CeO_2$, 0.2-0.4% of said $TiO_2$, 0.5-13 ppm of said CoO and 8-10 ppm of said Se, with provisos that the weight ratio of said ferrous iron to said ferric iron, $Fe^{2+}/Fe^{3+}$, is in the range from 0.20 to 0.30. Another preferred embodiment of the present invention includes a glass containing, on a weight basis, 0.25-0.35% of said total iron expressed as $Fe_2O_3$, 0.3-0.6% of said $CeO_2$, 0.2-0.4% of said $TiO_2$, 2-13 ppm of said CoO and 10-14 ppm of said Se, with provisos that the weight ratio of said ferrous iron to said ferric iron, $Fe^{2+}/Fe^{3+}$, is in the range from 0.30 to 0.40. Still another preferred embodiment of the present invention includes a glass containing, on a weight basis, 0.15-0.30% of said total iron expressed as $Fe_2O_3$, 0.3-0.6% of said $CeO_2$, 0.2-0.4% of said $TiO_2$, 2-13 ppm of said CoO and 11-16 ppm of said Se, with provisos that the weight ratio of said ferrous iron to said ferric iron, $Fe^{2+}/Fe^{3+}$, is in the range from 0.40-0.50.

A glass according to the invention has bronzy tint and sufficiently low in both infrared and ultraviolet radiation transmittance but sufficiently high in visible light transmittance, and this glass is very good in weatherability. An infrared and ultraviolet absorbing glass sheet according to the invention can easily be toughened to a desired degree by a conventional tempering method.

A glass according to the invention can be formed into glass sheets of various thicknesses, for example, ranging from about 1 mm to about 10 mm, and according to the need the glass sheets can be bent and/or tempered. Besides, a glass according to the invention can be used as a component of laminated glass or insulated glass. A glass sheet according to the invention is very suitable for use in building and vehicle windows and particularly in automobile windows. Optionally a glass according to the invention can be used for various articles other than window glasses, such as furniture and cooking utensils for example.

DESCRIPTION OF THE PREFERRED EMBODIMENTS

Figure 1:
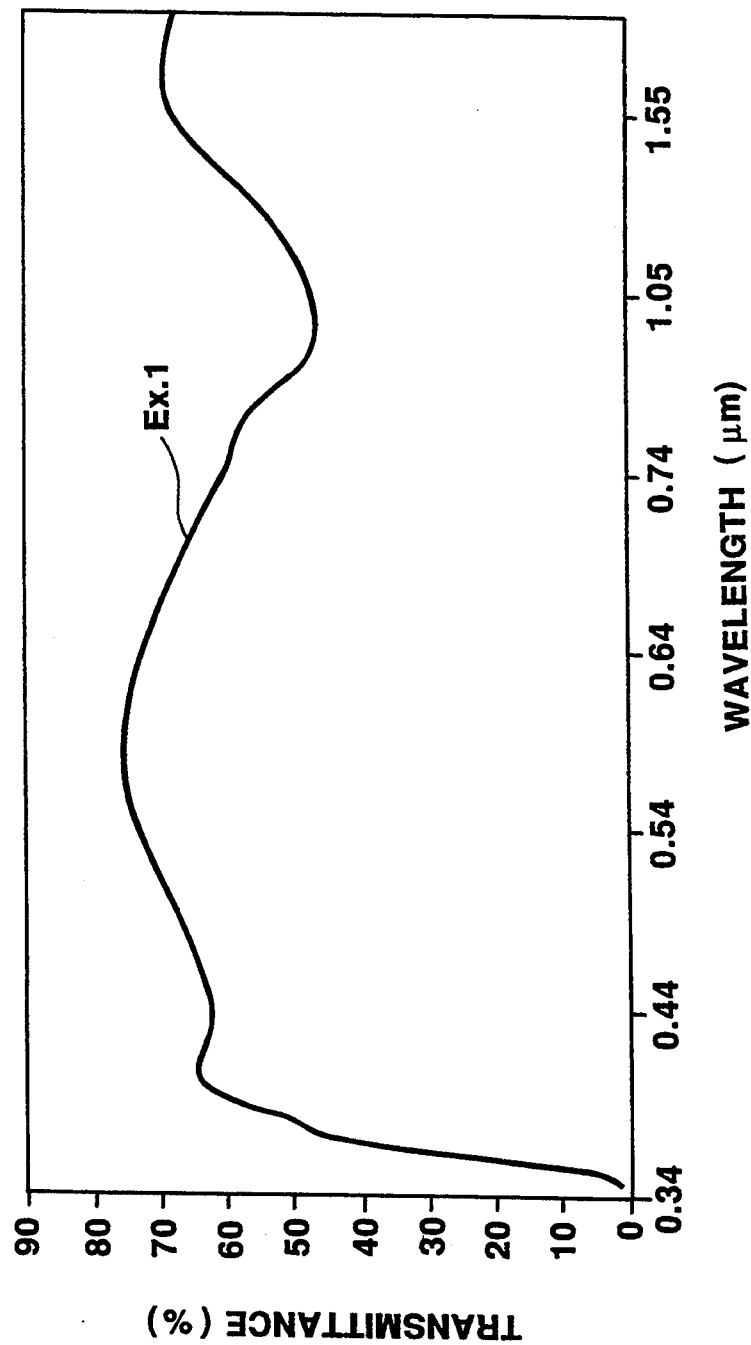
FIG. 1 is a graph showing a spectral transmittance curve with respect to a bronze-colored infrared and ultraviolet absorbing glass having a thickness of 4 ram, according to Example 1 of the present invention.

Basically an infrared and ultraviolet absorbing glass according to the invention is a soda-lime-silica glass. The fundamental components of the glass are $SiO_2$, $Al_2O_3$, CaO, MgO, $Na_2O$ and $K_2O$, and the proportions of these components are strictly limited in order that the glass should be easily produced by a usual glass-making process and should possess desirable properties including good temperability.

The glass contains 68 to 74 wt. % of $SiO_2$ together with 0.1 to 3.0 wt. % of $Al_2O_3$. If $SiO_2$ is less than 68% or $Al_2O_3$ is less than 0.1%, the glass is not always good in weatherability and may exhibit weathering strain. If $SiO_2$ exceeds 74%, the glass composition becomes inferior in meltability, and the glass may not be good in temperability. If $Al_2O_3$ exceeds 3.0%, the glassmaking operations encounter difficulty because of the likelihood of devitrification and narrowing of the range of temperature for forming glass.

The total amount of $SiO_2$ and $Al_2O_3$ in the glass is limited within the range from 68–74 wt. %. If the total amount is less than 68%, the glass is not always good in weatherability, and if it exceeds 74%, the glass may not be good in temperability.

The glass contains 8 to 11 wt. % of CaO and 2 to 4.5 wt. % of MgO. These components contribute to a reduction in the melting temperature of the glass composition. If CaO is less than 8% or MgO is less than 2%, the melting temperature is not sufficiently low, and the flow point of the glass is not desirably low particularly in the case of shortage of CaO. If CaO exceeds 11%, the glassmaking operations encounter difficulty because of the likelihood of devitrification. If MgO exceeds 4.5%, the glass may not be good in temperability. In the glass, the total amount of CaO and MgO is limited within the range from 11 to 15 wt. %. If the total of these two components is less than 11%, the glass is not good in temperability, and if it exceeds 15%, restrictions are placed on the glassmaking operations because of a tendency to devitrification.

The glass contains 11.5 to 16 wt. % of $Na_2O$ together with 0.5 to 3.0 wt. % of $K_2O$. If $Na_2O$ is less than 11.5%, difficulty arises in the glassmaking operations because of a tendency to devitrification and a narrowed range of temperature for forming the glass, and the glass is not good in temperability. If $Na_2O$ exceeds 16%, the glass is not always good in weatherability and may exhibit weathering strain. If $K_2O$ is less than 0.5%, the glass may not be good in temperability, and if it exceeds 3.0%, the glass may not be good in weatherability. In the glass, the total amount of $Na_2O$ and $K_2O$ is limited within the range from 12 to 17 wt. %. If the total of these two components is less than 12%, difficulty will arise in the glassmaking operations because of the likelihood of devitrification and narrowing of the range of operating temperature, and the glass is not good in temperability. If it exceeds 17%, the glass is not good in weatherability.

A glass according to the invention contains a limited amount of sulfur which is known to serve as a melting and refining aid. The glass contains 0.1 to 0.4 wt. % of sulfur expressed as $SO_3$. If the content of $SO_3$ is less than 0.1%, it is difficult to accomplish uniform melting and defoaming of the glass by usual operations. If the content of $SO_3$ exceeds 0.4%, the glass tends to exhibit yellowish or amber tint instead of desired bronzy tint. It is preferable that the $SO_3$ is relatively low and ranges from about 0.20 to about 0.35 wt. %.

The essential components of a glass according to the invention include limited amounts of iron oxides (expressed as $Fe_2O_3$ for convenience), $CeO_2$ and trace amounts of CoO and Se. These additives are employed as coloring components for desirably modifying the coloration and optical characteristics of the glass. In the invention, $TiO_2$ is optionally used as a coloring component.

In the glass, the amount of total iron expressed as $Fe_2O_3$ is from 0.10 to 0.55 wt. %, and more preferably from about 0.15 to about 0.47 wt. %.

More particularly, the glass must contain both ferrous iron expressed as FeO and ferric iron expressed as $Fe_2O_3$. FeO efficiently absorbs infrared radiation and tends to impart a greenish or bluish tint to the glass. $Fe_2O_3$ is absorptive of ultraviolet rays and tends to impart a yellowish tint to the glass. In a batch of glass composition for producing the infrared and ultraviolet absorbing glass, a large portion of iron is in the ferric state, $Fe_2O_3$. The batch is melted under such conditions that an adequate portion of the ferric oxide is reduced to ferrous oxide FeO, while the rest remains as ferric oxide $Fe_2O_3$. The degree of reduction of iron is an important factor in the glassmaking operations. Herein, the "degree of reduction" refers to the weight ratio of ferrous iron to ferric iron, $Fe^{2+}/Fe^{3+}$, in the obtained glass. In the present invention, the degree of reduction of iron is controlled within the range from 0.17 to 0.55 for obtaining a constant melting condition, a uniform bronzy tint and the desired optical characteristics (infrared and ultraviolet radiation absorption) of the glass. The degree of reduction is preferably from 0.18 to 0.53, and more preferably from 0.20 to 0.50.

$CeO_2$ and, if necessary, $TiO_2$ are incorporated in the glass as ultraviolet absorbing agents. $CeO_2$ has high ability to absorb ultraviolet rays, and the presence of $CeO_2$ considerably affects the degree of reduction of iron. $TiO_2$ is low in the ability to absorb ultraviolet rays, but the degree of reduction of iron is not significantly affected by the presence of $TiO_2$. In this invention, specific and relatively small amounts of $CeO_2$ and, if necessary, $TiO_2$ are used in order to afford the glass with desirably balanced optical characteristics without greatly varying the degree of reduction of iron in the conventional glass melting furnaces. In the glass, the amount of $CeO_2$ is from 0.2 to 0.6 wt. %, and more preferably from about 0.25 to about 0.50 wt. %. In the glass, if $TiO_2$ is used, its amount is from 0.15 to 0.45 wt. %, and more preferably from about 0.2 to 0.4 wt. %.

According to the invention, a very small amounts of CoO and Se as essential coloring agents are incorporated in the glass. The amount of CoO is from 0.3 to 14 ppm, preferably from about 0.5 to about 13 ppm, and more preferably from about 1 to about 12 ppm. $Co^{2+}$ has an absorption within a range from about 520 to about 540 nm, thereby rendering the glass bluish in color together with iron. The amount of Se is from 5 to 20 ppm, and more preferably from about 6 to about 17 ppm. Se renders the glass brown in color together with iron.

A very small amounts of MnO, ZnO and NiO are optionally incorporated in the glass.

A glass according to the present invention exhibits, at a thickness of 4 mm, visible light transmittance not less than 70% and more preferably not less than about 71%, total solar radiation transmittance ranging from 50 to 74% and more preferably ranging from 50 to 73%, and ultraviolet transmittance ranging from 15 to 28% and more preferably from 15 to 26%. In the present invention, the dominant wavelength is from about 572 nm to about 581 nm and more preferably from about 574 nm to about 579 nm, and the excitation purity is from about 3 to about 10 and more preferably from about 4 to about 9.5.

The following nonlimitative examples are illustrative of the invention.

EXAMPLE 1

As raw materials of glass, silica sand, feldspar, soda ash, dolomite, limestone, red iron oxide (rouge), titanium oxide, cerium carbonate, ilmenite, selenium frit glass and cobalt oxide were weighed and mixed together aiming at a prescribed glass composition. The glass composition was formulated such that the viscosity-temperature becomes about 650°-685° C. at $10^9$ poise and about 555°-585° C. at $10^{12}$ poise and such that the difference between the two temperatures becomes about 95°-105° C. A certain predetermined amount of carbon powder as a reducing agent was added to the mixture of raw materials. In a crucible the mixture of raw materials was melted by heating in an electric furnace at about 1400° C. for about 3 hr. In the melting operation, a certain predetermined amount of sodium sulfate as a clarifying agent was used. After the usual homogenizing and clarifying operations, the molten glass was formed into a glass sheet. After annealing, the glass sheet was cut into glass sheets 100 mm × 100 mm in widths and about 4 mm in thickness, and the glass sheet was ground and polished.

By chemical analysis based on JIS R-3101, the obtained glass contained, on a weight basis, as fundamental components, 70.2% $SiO_2$, 1.8% $Al_2O_3$, 9.0% CaO, 3.5% MgO, 13.0% $Na_2O$, 1.0% $K_2O$ and 0.2% $SO_3$. The amounts of the coloring components of the obtained glass are shown in Table 1. The total of these fundamental and coloring components amounted to about 99.818%. The total of $SiO_2$ and $Al_2O_3$ was 72.0%; the total of CaO and MgO was 12.5%; and the total of $Na_2O$ and $K_2O$ was 14.0%. The amount of FeO was determined from transmittance at about 1.10 μm in infrared range, which is shown in FIG. 1. The calculated degree of reduction of iron, $Fe^{2+}/Fe^{3+}$, was about 0.279.

The obtained glass had a pale bronze color. The optical characteristics of this glass were measured by the methods according to JIS Z-8722, JIS R-3106 and ISO/DIS-9050 by using an automated spectrophotometer. At a thickness of 4 mm, the glass exhibited visible light (standard illuminant A) transmittance of about 73.4%, total solar radiation transmittance of about 59.5% and ultraviolet transmittance of about 16.7%. The transmittance for solar radiation in an infrared region (around 1100 nm) was about 58.9%. The dominant wavelength was about 574.3 nm, and the excitation purity was about 8.4.

It was confirmed that the viscosity-temperatures of this glass were as aimed. To test temperability, some of the glass sheets were tempered by heating in a furnace at a temperature ranging from about 650° C. to about 730° C. for about 5 rain and immediately blowing cooling air against the heated glass sheet. The tempered glass sheets were fractured by an impact at a point in a corner region to examine the manner of fragmentation in respect of the number of fragments and the sizes of the respective fragments. The manner of fragmentation satisfied the requirements of JIS R-3211 for tempered glasses for automobile side and rear windows.

EXAMPLES 2-5

In these examples, the glassmaking operations of Example 1 were repeated except that the proportions of the raw materials were varied with the aim of a different glass composition.

In these examples, the obtained glass contained approximately the same amounts of the fundamental glass components ($SiO_2$, $Al_2O_3$, CaO, MgO, $Na_2O$, $K_2O$ and $SO_3$) as those of Example 1. The amounts of coloring components of the obtained glass are shown in Table 1.

The obtained glasses had a bronzy tint. The optical characteristics of the obtained glasses are shown in Table 2.

The temperability of the obtained glasses was tested by the same method as in Example 1. The tempering was accomplished without problem, and the result of the fracture test satisfied the provisions of the standard.

EXAMPLE 6

As raw materials of glass, silica sand, feldspar, soda ash, dolomite, limestone, red iron oxide (rouge), cerium carbonate, ilmenite and cobalt oxide were weighed and mixed together aiming at a prescribed glass composition. If necessary, selenium frit glass was used as a raw material of glass. The glass composition was formulated such that the viscosity-temperature becomes about 650°-685° C. at 109 poise and about 555°-585° C. at $10^{12}$ poise and such that the difference between the two temperatures becomes about 95°-105° C. A certain predetermined amount of carbon powder (for example, about 0.175 g of carbon powder relative to 100 g of glass) as a reducing agent was added to the mixture of raw materials. In a crucible the mixture of raw materials was melted by heating in an electric furnace at a temperature ranging from about 1400° C. to about 1450° C. for about 3 to about 4 hr. In the melting operation, a certain predetermined amount of sodium sulfate (for example, the ratio of sodium sulfate to total silica is from about 0.5 to about 2.0) as a clarifying agent was used. After the usual homogenizing and clarifying operations, the molten glass was formed into a glass sheet. After annealing, the glass sheet was cut into glass sheets 100 mm×100 mm in widths and about 4 mm in thickness, and the glass sheet was ground and polished.

By chemical analysis based on JIS R-3101, the obtained glass contained, on a weight basis, as fundamental components, 70.3% $SiO_2$, 1.9% $Al_2O_3$, 9.1% CaO, 3.5% MgO, 13.4% $Na_2O$, 0.9% $K_2O$ and 0.2% $SO_3$. The total of $SiO_2$ and $Al_2O_3$ was 72.2%; the total of CaO and MgO was 12.6%; and the total of $Na_2O$ and $K_2O$ was 14.3%. The amounts of the coloring components of the obtained glass are shown in Table 1. The total of these fundamental and coloring components amounted to about 99.915%.

Figure 2:
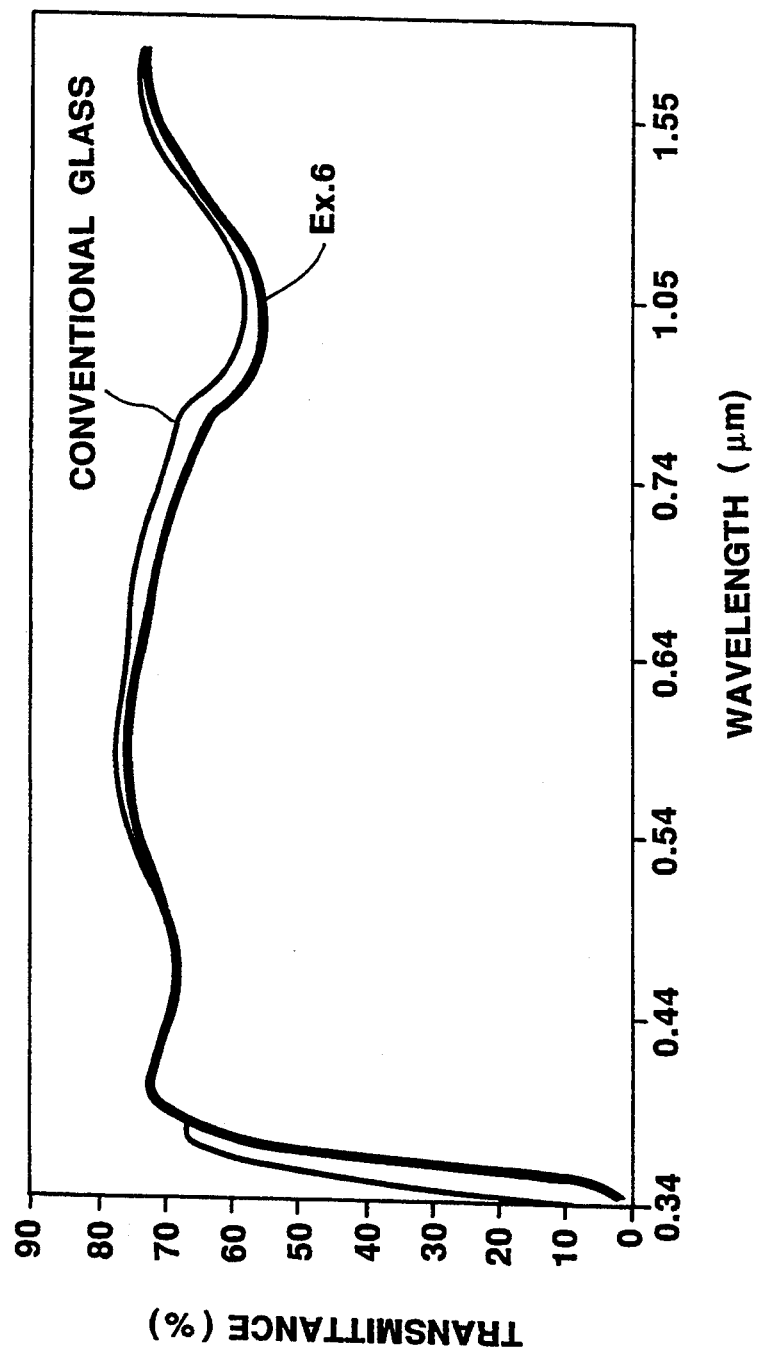
FIG. 2 is graph similar to FIG. 1, but showing a spectral transmittance curve with respect to a glass according to Example 6 and another spectral transmittance curve with respect to a conventional bronze-colored glass.

The amount of FeO was determined from transmittance at about 1.10 gm in infrared range, which is shown in FIG. 2. The calculated degree of reduction of iron, $Fe^{2+}/Fe^{3+}$, was about 0.429.

The obtained glass had a pale bronze color. The optical characteristics of this glass were measured by the same methods as in Example 1. The results are shown in Table 2.

The temperability of the obtained glasses was tested by the same method as in Example 1. The tempering was accomplished without problem, and the result of the fracture test satisfied the provisions of the standard.

EXAMPLES 7-17

In these examples, the glassmaking operations of Example 6 were repeated except that the proportions of the raw materials were varied with the aim of a different glass composition.

In these examples, the obtained glass contained approximately the same amounts of the fundamental glass components as those of Example 6. The amounts of coloring components of the obtained glass are shown in Table 1.

The obtained glasses had bronzy tint. The optical characteristics of the obtained glasses are shown in Table 2.

The temperability of the obtained glasses was tested by the same method as in Example 1. The tempering was accomplished without problem, and the result of the fracture test satisfied the provisions of the standard.

TABLE 1

| | Fe₂O₃ (wt %) | CeO₂ (wt %) | TiO₂ (wt %) | CoO (ppm) | Se (ppm) | Fe²⁺/Fe³⁺ |
|---|---|---|---|---|---|---|
| Ex. 1 | 0.397 | 0.41 | 0.31 | 0.6 | 8.1 | 0.279 |
| Ex. 2 | 0.303 | 0.40 | 0.30 | 5.8 | 13.4 | 0.373 |
| Ex. 3 | 0.304 | 0.40 | 0.30 | 5.9 | 11.4 | 0.334 |
| Ex. 4 | 0.228 | 0.40 | 0.30 | 5.4 | 12.0 | 0.429 |
| Ex. 5 | 0.237 | 0.42 | 0.31 | 5.0 | 15.1 | 0.412 |
| Ex. 6 | 0.203 | 0.41 | — | 6.5 | 10.2 | 0.429 |
| Ex. 7 | 0.201 | 0.41 | — | 5.4 | 12.9 | 0.454 |
| Ex. 8 | 0.203 | 0.42 | — | 3.9 | 16.3 | 0.446 |
| Ex. 9 | 0.217 | 0.40 | — | 7.4 | 9.8 | 0.290 |
| Ex. 10 | 0.253 | 0.39 | — | 4.4 | 12.1 | 0.360 |
| Ex. 11 | 0.253 | 0.40 | — | 7.5 | 9.5 | 0.358 |
| Ex. 12 | 0.299 | 0.39 | — | 4.8 | 10.8 | 0.232 |
| Ex. 13 | 0.304 | 0.41 | — | 8.0 | 10.0 | 0.279 |
| Ex. 14 | 0.355 | 0.40 | — | 4.9 | 10.9 | 0.310 |
| Ex. 15 | 0.356 | 0.40 | — | 6.2 | 9.6 | 0.302 |
| Ex. 16 | 0.159 | 0.40 | — | 6.1 | 13.3 | 0.441 |
| Ex. 17 | 0.164 | 0.40 | — | 6.4 | 9.8 | 0.309 |

Table 2

TABLE 2

| | $T_V$ (%) | $T_{TS}$ (%) | $T_{IR}$ (%) | $T_{UV}$ (%) | $\lambda_D$ (nm) | Excitation Purity |
|---|---|---|---|---|---|---|
| Ex. 1 | 73.4 | 59.5 | 58.9 | 16.7 | 574.3 | 8.4 |
| Ex. 2 | 70.3 | 59.6 | 58.4 | 17.6 | 577.1 | 9.5 |
| Ex. 3 | 71.8 | 60.9 | 59.6 | 18.3 | 576.4 | 8.3 |
| Ex. 4 | 71.5 | 61.4 | 60.2 | 19.3 | 577.4 | 8.6 |
| Ex. 5 | 70.1 | 62.1 | 60.8 | 19.0 | 577.9 | 9.2 |
| Ex. 6 | 75.8 | 67.2 | 65.9 | 24.2 | 576.6 | 4.6 |
| Ex. 7 | 74.1 | 65.9 | 64.6 | 22.7 | 578.4 | 7.2 |
| Ex. 8 | 72.5 | 64.6 | 63.2 | 22.1 | 579.1 | 8.3 |
| Ex. 9 | 77.9 | 71.1 | 69.7 | 24.6 | 577.2 | 8.6 |
| Ex. 10 | 72.6 | 64.4 | 63.1 | 20.9 | 578.7 | 8.3 |
| Ex. 11 | 74.9 | 71.1 | 69.7 | 22.4 | 576.0 | 4.9 |
| Ex. 12 | 75.1 | 67.0 | 65.7 | 20.9 | 577.7 | 6.9 |
| Ex. 13 | 75.7 | 66.2 | 65.0 | 21.5 | 574.8 | 4.7 |
| Ex. 14 | 73.3 | 61.5 | 60.3 | 19.9 | 575.1 | 6.4 |
| Ex. 15 | 73.7 | 62.4 | 61.3 | 19.9 | 573.9 | 5.3 |
| Ex. 16 | 76.6 | 70.8 | 69.3 | 24.8 | 579.5 | 6.4 |
| Ex. 17 | 78.7 | 73.1 | 71.7 | 25.6 | 578.3 | 4.1 |

$T_V$: Visible Transmittance (standard illuminant A)
$T_{TS}$: Total Solar Radiation Transmittance
$T_{IR}$: Transmittance for Solar Radiation in an Infrared Region (around 1100 nm)
$T_{UV}$: Ultraviolet Transmittance
$\lambda_D$: Dominant Wavelength

What is claimed is:

1. A bronze-colored infrared and ultraviolet radiation absorbing glass comprising a soda lime silica base glass, and consisting essentially of as coloring components, on a weight basis, 0.10–0.55% of total iron expressed as $Fe_2O_3$, 0.2–0.6% of $CeO_2$, 0.3–14 ppm of CoO and 5–20 ppm of Se,
   wherein said total iron includes ferrous iron and ferric iron and the weight ratio of said ferrous iron to said ferric iron, $Fe^{2+}/Fe^{3+}$, is in the range from 0.17 to 0.55.

2. A glass according to claim 1, wherein said base glass comprises as fundamental components, on a weight basis, 68–74% of $SiO_2$, 0.1–3.0% of $Al_2O_3$, 8–11% of CaO, 2.0–4.5% of MgO, 11.5–16.0% of $Na_2O$, 0.5–3.0% of $K_2O$, 0.1–0.4% of $SO_3$, with provisos that the total of $SiO_2$ and $Al_2O_3$ is from 68–74%, that the total of CaO and MgO is from 11–15% and that the total of $Na_2O$ and $K_2O$ is from 12–17%.

3. A glass according to claim 1, wherein the amount of said total iron expressed as $Fe_2O_3$ is in the range from 0.10 to 0.50, the amount of said CoO is in the range from 2 to 14 ppm on a weight basis, and the amount of said Se is in the range from 7 to 18 ppm on a weight basis, with provisos that said total iron includes ferrous iron and ferric iron and that the weight ratio of said ferrous iron to said ferric iron, $Fe^{2+}/Fe^{3+}$, is in the range from 0.22 to 0.50.

4. A bronze-colored infrared and ultraviolet radiation absorbing glass comprising a soda lime silica base glass, and consisting essentially of as coloring components, on a weight basis, 0.10–0.55% of total iron expressed as $Fe_2O_3$, 0.2–0.6% of $CeO_2$, 0.3–14 ppm of CoO and 5–20 ppm of Se,
   wherein said total iron includes ferrous iron and ferric iron and the weight ratio of said ferrous iron to said ferric iron, $Fe^{2+}/Fe^{3+}$, is in the range from 0.17 to 0.55, and
   wherein said glass at a thickness of 4 mm is not lower than 70% in visible light transmittance with using the standard illuminant A, from 50 to 74% in total solar radiation transmittance and from 15 to 28% in ultraviolet radiation transmittance.

5. A glass according to claim 4, wherein said total solar radiation transmittance is in the range from 50 to 65%, and said ultraviolet radiation transmittance is in the range from 15 to 25%.

6. A glass according to claim 5, wherein said glass at a thickness of 4 mm is from 572 to 580 nm in dominant wavelength and from 7 to 9.5 in excitation purity.

7. A glass according to claim 4, wherein said total solar radiation transmittance is from 55 to 74%.

8. A glass according to claim 4, wherein said glass at a thickness of 4 mm is from 572 to 581 nm in dominant wavelength and from 3 to 10 in excitation purity.

9. A bronze-colored infrared and ultraviolet radiation absorbing glass comprising a soda lime silica base glass, and consisting essentially of as coloring components, on a weight basis, 0.13–0.55% of total iron expressed as $Fe_2O_3$, 0.2–0.6% of $CeO_2$, 0.15–0.45% of $TiO_2$, 0.3–14 ppm of CoO and 5–20 ppm of Se, wherein said total iron includes ferrous iron and ferric iron and the weight ratio of said ferrous iron to said ferric iron, $Fe^{2+}/Fe^{3+}$, is in the range from 0.17 to 0.55.

10. A glass according to claim 9, wherein said glass comprises as coloring components, on a weight basis, 0.35–0.43% of said total iron expressed as $Fe_2O_3$, 0.3–0.6% of said $CeO_2$, 0.2–0.4% of said $TiO_2$, 0.5–13 ppm of said CoO and 8–10 ppm of said Se, with provisos that the weight ratio of said ferrous iron to said ferric iron, $Fe^{2+}/Fe^{3+}$, is in the range from 0.20 to 0.30.

11. A glass according to claim 9, wherein said glass comprises as coloring components, on a weight basis, 0.25–0.35% of said total iron expressed as $Fe_2O_3$, 0.3–0.6% of said $CeO_2$, 0.2–0.4% of said $TiO_2$, 2–13 ppm of said CoO and 10–14 ppm of said So, with provisos that the weight ratio of said ferrous iron to said ferric iron, $Fe^{2+}/Fe^{3+}$, is in the range from 0.30 to 0.40.

12. A glass according to claim 9, wherein said glass comprises as coloring components, on a weight basis, 0.15–0.30% of said total iron expressed as $Fe_2O_3$, 0.3–0.6% of said $CeO_2$, 0.2–0.4% of said $TiO_2$, 2–13 ppm of said CoO and 11–16 ppm of said Se, with provisos that the weight ratio of said ferrous iron to said ferric iron, $Fe^{2+}/Fe^{3+}$, is in the range from 0.40–0.50.

* * * * *